Patented Sept. 17, 1940

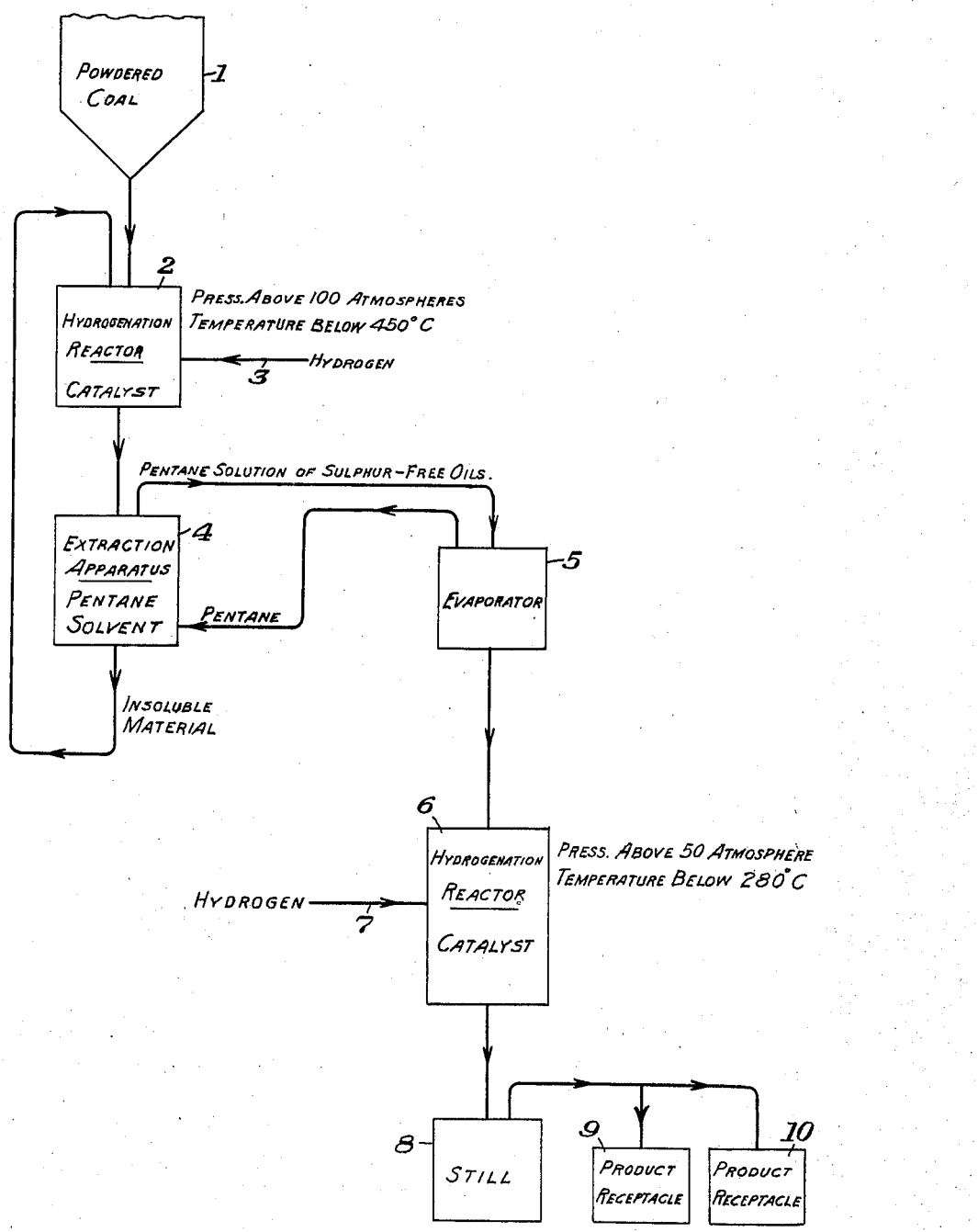

2,215,206

UNITED STATES PATENT OFFICE 2,215,206

HYDROGENATION OF COAL

Burnard S. Biggs, Summit, N. J., and Joseph F. Weiler, Wilkinsburg, Pa., assignors to Carnegie Institute of Technology, Pittsburgh, Pa., a corporation of Pennsylvania Application July 6, 1937, Serial No. 152,144

5 Claims. (Cl. 196—53)

Our invention relates to the hydrogenation of coal. The process consists in the treatment of finely ground coal or the extracts or residues from the solvent extraction of coal with hydrogen at pressures above 100 atmospheres and at temperatures below those at which substantial cracking occurs, usually below 450° C. and in the presence of a suitable hydrogenating catalyst which is stable against sulphur and which eliminates the sulphur from organic compounds under the above conditions. Such a catalyst may comprise a mixture of the oxides of copper and chromium or a mixture of the oxides of copper, chromium, and calcium. The treatment is continued for such time, usually less than 24 hours, as is required to produce an appreciable amount of products soluble in low boiling paraffinic or naphthenic hydrocarbons such as pentane, hexane, and cyclohexane, but a minimum of products boiling below 200° C. The soluble material is recoverd by dissolving it in a hydrophobic solvent, for example, low boiling paraffinic or naphthenic hydrocarbon solvents, such as pentane, hexane, or cyclohexane, and the insoluble residue is retreated as hereinabove described, with or without the addition of more catalyst. The process can be repeated until well over 80% of the carbon of the coal has been converted into soluble products, or, of course, the process can be interrupted at any stage.

If perchance the sulphur has not been substantially entirely eliminated, the combined soluble products should be retreated as it is necessary for the success of the succeeding treatment that the material be substantially free from sulphur as a very small percentage of sulphur is sufficient to seriously interfere with the activity of the nickel catalyst which is used as hereinafter described.

All the soluble products initially produced, as we have outlined, are combined and then treated with hydrogen under pressures above 50 atmospheres at temperatures below 280° C. in the presence of an active nickel catalyst, or any other catalyst, such as, for example, platinum or palladium, that has the property of promoting hydrogenation of the benzene ring for as long a period of time as is required for the rate of absorption of hydrogen to become inappreciable. This period of time is usually less than 24 hours.

The material thus produced is a viscous, brown liquid with a carbon-hydrogen ratio and oxygen content such as will indicate that the material consists principally of compounds of a hydroaromatic character. Distillation of this material yields fractions boiling from about 190° to about 500° C. The fractions have average molecular weights ranging from about 150 to about 500 and refractive indices ranging from about 1.46 to above 1.60. The lower boiling fractions are water white limpid liquids; the intermediate fractions are clear lemon yellow viscous liquids of marked stickiness; the higher fractions are clear orange to deep red resinous solids.

It will be observed that the use of a catalyst comprising a mixture of the oxides of copper and chromium or a mixture of the oxides of calcium, copper, and chromium enable high boiling liquid products to be produced by the treatment of coal with hydrogen, the said liquid products being sufficiently free from sulphur to permit subsequent hydrogenation thereof with a nickel catalyst without poisoning the catalyst.

The drawing is a diagrammatic view of an apparatus suitable for carrying out the improved process.

In the drawing, reference numeral 1 denotes a hopper from which finely divided coal or the extracts or residues from the solvent extraction of coal may be fed into a hydrogenation reactor 2. The coal or extract may be mixed with a catalyst comprising the oxides of calcium, copper and chromium before or after it is placed in the hydrogenation reactor 2. The reactor 2 is of any desired type and hydrogen under pressure is led to it through the line 3. The product from the reactor 2 is passed to the extraction apparatus 4, of any desired type, where it is treated with a hydrophobic solvent, for example, a low boiling paraffinic or naphthenic hydrocarbon solvent, such as pentane, hexane or cyclohexane, and the dissolved material is passed to the evaporator 5 and the insoluble residue is returned to the reactor 2 for retreatment in the evaporator 5, the pentane is evaporated from the oils and may be returned to the extractor 4. The sulphur-free oil from the evaporator 5 is passed into the second hydrogenation reactor 6, where it is treated with hydrogen introduced by way of pipe 7. The hydrogen is under pressure above 50 atmospheres and at a temperature below 280° C., and a suitable catalyst, such as a Raney nickel catalyst, is provided in the reactor 6. The material from the reactor 6 is passed into an ordinary distillation still 8, where the final distillation of the products takes place. The products are led into suitable receptacles 9 and 10, one for each product, here represented as two.

Apparatus of a standard type may be used throughout, but as such apparatus forms no part of our invention, it is considered unnecessary to describe it further.

The following examples will further illustrate the nature of this invention, but the invention is not restricted to these examples.

*Example 1*

Two hundred (200) grams of residue from the extraction of 200-mesh Edenborn coal with benzene at 260° C. intimately mixed with a catalyst comprising the oxides of calcium, copper, and chromium were treated with hydrogen at 250 atmospheres at 350° C. in seven stages of 24 hours each, with between-stage removal of products soluble in cyclohexane. One hundred and thirty-five (135) grams of liquid product were thus produced which on treatment with hydrogen at 200 atmospheres at 220° C. over Raney nickel catalyst for 24 hours combined with 3.5 grams of hydrogen. The resulting material upon fractional distillation gave the following products.

| No. | Grams | Initial atmos., B. P. | $n_D^{25}$ | Molecular weights— In catechol | In diphenyl | Appearance |
|---|---|---|---|---|---|---|
| $R_1$ | 3.0 | 190 | 1.467 | 122 | 128 | Water white limpid. |
| $R_2$ | 5.4 | 205 | 1.482 | 146 | 144 | Do. |
| $R_3$ | 2.5 | 230 | 1.494 | 175 | 177 | Do. |
| $R_4$ | 5.5 | 262 | 1.509 | 195 | 198 | Do. |
| $R_5$ | 2.5 | 315 | 1.524 | 198 | 218 | Water white slightly viscous. |
| $R_6$ | 15.9 | 320 | 1.540 | 244 | 252 | Yellow, honeylike consistency. |
| $R_7$ | 17.9 | 395 | 1.563 | 330 | 338 | Brown, just flows at 20°, sticky. |
| $R_8$ | 16.4 | 450 | 1.593 | 405 | 448 | Deep red, does not flow, tacky. |
| $R_9$ | 51.6 | | | | | Deep ruby red with green fluorescence brittle. |

Nos. $R_1$ through $R_5$ are from the refraction of the fraction taken off at atmospheric pressure. No. $R_9$ is the residue remaining in the still.

*Example 2*

Two hundred and fifty (250) grams of 200-mesh Edenborn coal was intimately mixed with a catalyst comprising the oxides of calcium, copper and chromium and treated with hydrogen under 250 atmospheres pressure at 350° C. in six stages of 24 hours each with between-stage removal of products soluble in cyclohexane. One hundred and forty-eight (148) grams of liquid product were obtained which on treatment with hydrogen under 200 atmospheres at 220° C. over Raney nickel catalyst for 24 hours combined with 3.5 grams of hydrogen. There was recovered 149.9 grams of material which upon fractional distillation gave the following products.

| No. | Grams | Initial atmos., B. P. °C. | $n_D^{25}$ | Molecular weight in diphenyl | H/C | Appearance |
|---|---|---|---|---|---|---|
| 1 | 5.0 | 180 | 1.468 | 150 | 1.83 | Water white, limpid. |
| 2 | 13.0 | 200 | 1.479 | 160 | 1.76 | Do. |
| 3 | 9.7 | 250 | 1.505 | 195 | 1.60 | Do. |
| 4 | 12.2 | 300 | 1.529 | 245 | 1.56 | Water white, slightly viscous. |
| 5 | 8.0 | 325 | 1.541 | 285 | 1.49 | Lemon yellow, honeylike. |
| 6 | 4.0 | 360 | 1.552 | 310 | 1.49 | Lemon yellow just flows at 20° C. |
| 7 | 8.0 | 385 | 1.561 | 350 | 1.48 | Brown yellow, resinous. |
| 8 | 9.0 | 410 | 1.571 | 390 | 1.40 | Do. |
| 9 | 8.3 | 450 | 1.582 | 405 | 1.39 | Red with green fluorescence, brittle solid, tacky. |
| Residue | 62.0 | | 1.635 | 550 | 1.21 | Deep red brown, brittle solid, not tacky. |
| Loss | 10.7 | | | | | |
| | 149.9 | | | | | |

Many of the products obtained by following the teachings of our invention are useful for electric varnishes. Other uses may be found for these products.

It is not feasible to set forth all the optimum conditions necessary for the treatment of all coals, but the optimum conditions for each particular type of coal can readily be determined experimentally by following the teachings of our invention.

While we have described the preferred embodiment of our invention, it is to be understood that various modifications in the details thereof may be made without departing from the spirit of the invention, which is not limited other than as in the appended claims.

We claim:

1. In the method of treating finely divided coal, the steps which comprise heating coal at a temperature below that at which substantial cracking takes place and at a pressure above 100 atmospheres and in the presence of a hydrogenating catalyst of a character which eliminates sulphur from organic compounds under the stated conditions, recovering the sulphur-free oils with a hydrocarbon solvent which is a liquid at normal temperature and pressure, and treating the oils so recovered with hydrogen at a pressure above 50 atmospheres and at a temperature below 280° C. in the presence of a catalyst which has the property of promoting hydrogenation of the benzene ring.

2. In the method of treating finely divided coal, the steps which comprise heating coal at a temperature below that at which substantial cracking takes place and at a pressure above 100 atmospheres and in the presence of a hydrogenating catalyst selected from the group consisting of a mixture of the oxides of copper and chromium and a mixture of the oxides of copper, chromium, and calcium, recovering the sulphur-free oils with a hydrocarbon solvent which is a liquid at normal temperature and pressure, and treating the oil so recovered with hydrogen at a pressure above 50 atmospheres and at a temperature below 280° C. in the presence of a catalyst which has the property of promoting hydrogenation of the benzene ring.

3. In the method of treating finely divided coal, the steps which comprise heating coal at a temperature below that at which substantial cracking takes place and at a pressure above 100 atmospheres and in the presence of a hydrogenating catalyst composed of a mixture of the oxides of copper, chromium, and calcium, recovering the sulphur-free oils with a hydrocarbon solvent which is a liquid at normal temperature and pressure, and treating the oils so recovered with hydrogen at a pressure above 50 atmospheres and at a temperature below 280° C. in the presence of a catalyst which has the property of promoting hydrogenation of the benzene ring.

4. In the method of treating finely divided coal, the steps which comprise heating coal at a temperature below that at which substantial cracking takes place and at a pressure above 100 atmospheres and in the presence of a hydrogenating catalyst of a character which eliminates sulphur from organic compounds under the stated conditions, recovering the sulphur-free oils with a hydrocarbon solvent which is a liquid at normal temperature and pressure, re-treating the undissolved residue as above, combining the dissolved oils, and treating the combined oils so recovered with hydrogen at a pressure above 50 atmospheres in the presence of a nickel catalyst.

5. In the method of treating finely divided coal, the steps which comprise heating coal at a temperature below that at which substantial cracking takes place and at a pressure above 100 atmospheres and in the presence of a hydrogenating catalyst of a character which eliminates sulphur from organic compounds under the stated conditions, recovering the sulphur-free oils with a hydrocarbon solvent which is a liquid at normal temperature and pressure, retreating the undissolved residue as above, combining the dissolved oils, and treating the combined oils so recovered with hydrogen at a pressure above 50 atmospheres and at a temperature below 280° C. in the presence of a catalyst which has the property of promoting hydrogenation of the benzene ring and thereafter fractionating the mixture.

BURNARD S. BIGGS.
JOSEPH F. WEILER.